(12) United States Patent
Weng

(10) Patent No.: US 7,413,208 B2
(45) Date of Patent: Aug. 19, 2008

(54) BICYCLE FRAME

(75) Inventor: Ming-Chien Weng, Changhua City (TW)

(73) Assignee: Astro Engineering Co., Ltd., Changhua County (TW)

( * ) Notice: Subject to any disclaimer, the term of this patent is extended or adjusted under 35 U.S.C. 154(b) by 306 days.

(21) Appl. No.: 11/409,363

(22) Filed: Apr. 20, 2006

(65) Prior Publication Data

US 2007/0246909 A1    Oct. 25, 2007

(51) Int. Cl.
*B62K 25/28* (2006.01)

(52) U.S. Cl. ..................................... 280/284

(58) Field of Classification Search ............... 280/283, 280/284
See application file for complete search history.

(56) References Cited

U.S. PATENT DOCUMENTS

| | | | |
|---|---|---|---|
| 944,795 A * | 12/1909 | Leet et al. .................. | 280/284 |
| 6,845,998 B2 * | 1/2005 | Probst ........................ | 280/284 |
| 2005/0253357 A1 * | 11/2005 | Chang et al. ................ | 280/283 |
| 2006/0119070 A1 * | 6/2006 | Weagle ...................... | 280/284 |
| 2006/0197306 A1 * | 9/2006 | O'Connor ................... | 280/284 |

\* cited by examiner

*Primary Examiner*—Kevin Hurley

(57) ABSTRACT

A bicycle frame has a front frame, a lower bracket assembly, an upper bracket assembly, a rear frame and a shock absorber. The front frame has a head tube, a down tube, a bottom bracket shell and seat tube. The lower bracket assembly is connected pivotally to the bottom bracket shell and has a lower connecting bracket. The upper bracket assembly is connected pivotally to the seat tube and has two upper connecting brackets. The rear frame is connected pivotally to the upper connecting brackets and the lower connecting bracket of the upper and lower bracket assemblies and has an upper fork, a lower fork and two dropouts. The shock absorber is mounted pivotally between the upper connecting brackets and the lower connecting bracket.

9 Claims, 6 Drawing Sheets

BICYCLE FRAME

BACKGROUND OF THE INVENTION

1. Field of the Invention

The present invention relates to a frame, and more particularly to a frame for a bicycle that has a shock absorber to provide smooth operation.

2. Description of Related Art

With reference to FIGS. 5 and 6, a conventional bicycle frame with a shock absorbing capability has a front frame (91), a rear frame (94, 94') and a shock absorber (90A, 90B). The front frame (91) has a mounting bracket (92) and a driving bracket (93, 93'). The mounting bracket (92) is attached solidly to the front frame (91). The driving bracket (93, 93') is attached pivotally to the front frame (91) and has a front end and a rear end. The rear frame (94, 94') is connected pivotally to the front frame (91) and the rear end of the driving bracket (93, 93') and move ups and pivots the driving bracket (93, 93') when a shock is transmitted to the rear frame (94, 94'). The front end of the driving bracket (93, 93') protrudes into the front frame (91). The shock absorber (90A, 90B) is mounted pivotally between the mounting bracket (92) and the front end of the driving bracket (93, 93') and absorbs any shock transmitted to the driving bracket (93, 93') from the rear frame (94, 94').

However, the conventional bicycle frame has the following shortcomings.

1. When the driving bracket (93) in one embodiment of the conventional bicycle frame presses the shock absorber (90A), the shock absorber (90A) is subjected to an angular displacement of up to about 5.67°. In another embodiment of the conventional bicycle frame, the shock absorber (90B) is subjected to an angular displacement of up to about 9.94°.

2. The angular displacement of the shock absorber (90A, 90B) produces lateral friction in the shock absorber (90A, 90B), which causes the shock absorber (90A, 90B) to wear unevenly and eventually fail. Even slight uneven wear of the shock absorber (90A, 90B) can adversely influence the effectiveness of the shock absorber (90A, 90B) and reduce the smoothness and comfort of the conventional bicycle frame.

SUMMARY OF THE INVENTION

The main objective of the present invention is to provide a bicycle frame with a shock absorber that provides smooth operation.

The bicycle frame in accordance with the present invention has a front frame, a lower bracket assembly, an upper bracket assembly, a rear frame and a shock absorber. The front frame has a head tube, a down tube, a bottom bracket shell and a seat tube. The lower bracket assembly is connected pivotally to the bottom bracket shell and has a lower connecting bracket. The upper bracket assembly is connected pivotally to the seat tube and has two upper connecting brackets. The rear frame is connected pivotally to the upper connecting brackets and the lower connecting bracket of the upper and lower bracket assemblies and has an upper fork, a lower fork and two dropouts. The shock absorber is mounted pivotally between the upper connecting brackets and the lower connecting bracket.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
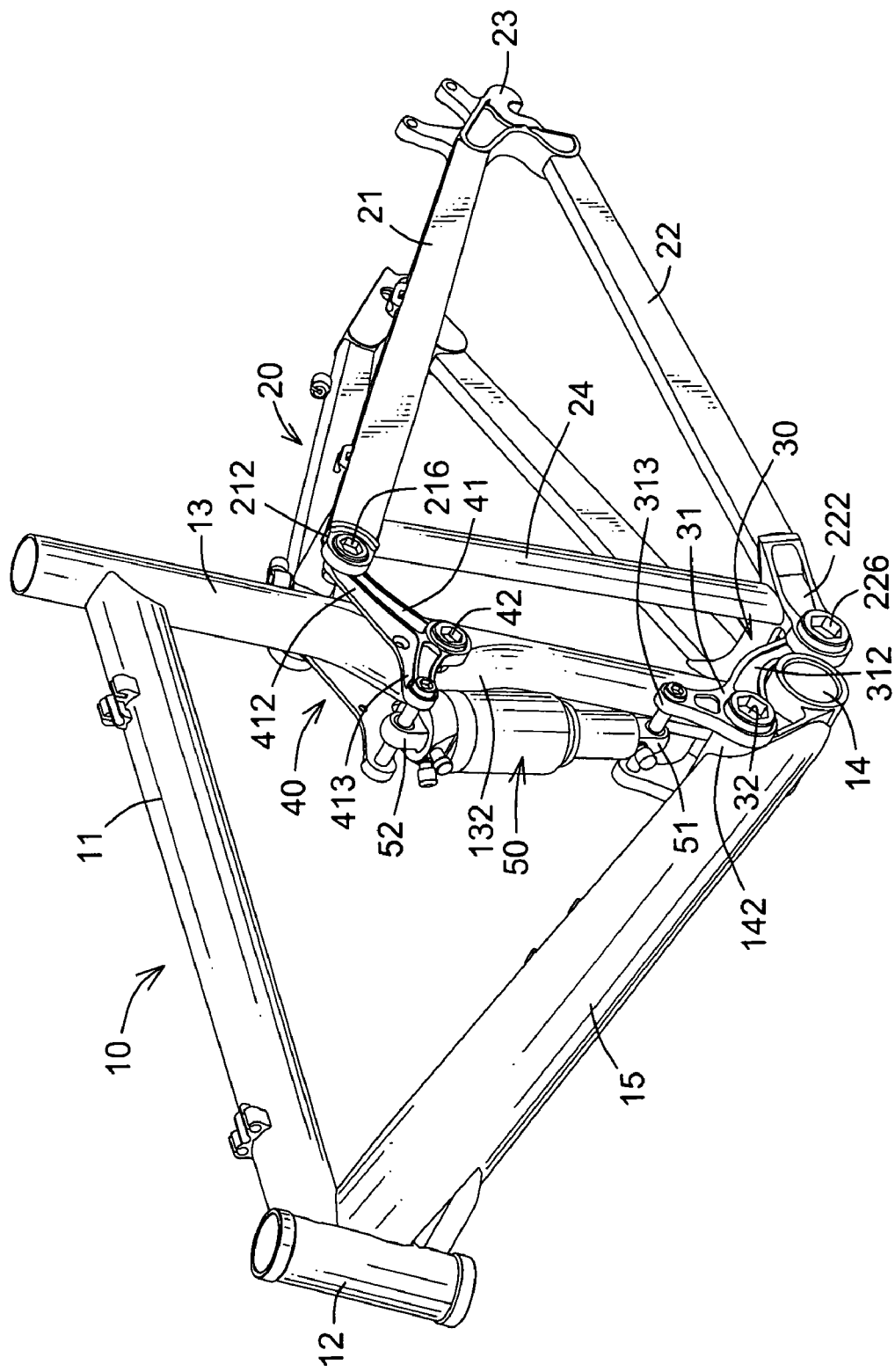
FIG. 1 is a perspective view of a bicycle frame in accordance with the present invention.
Figure 2:
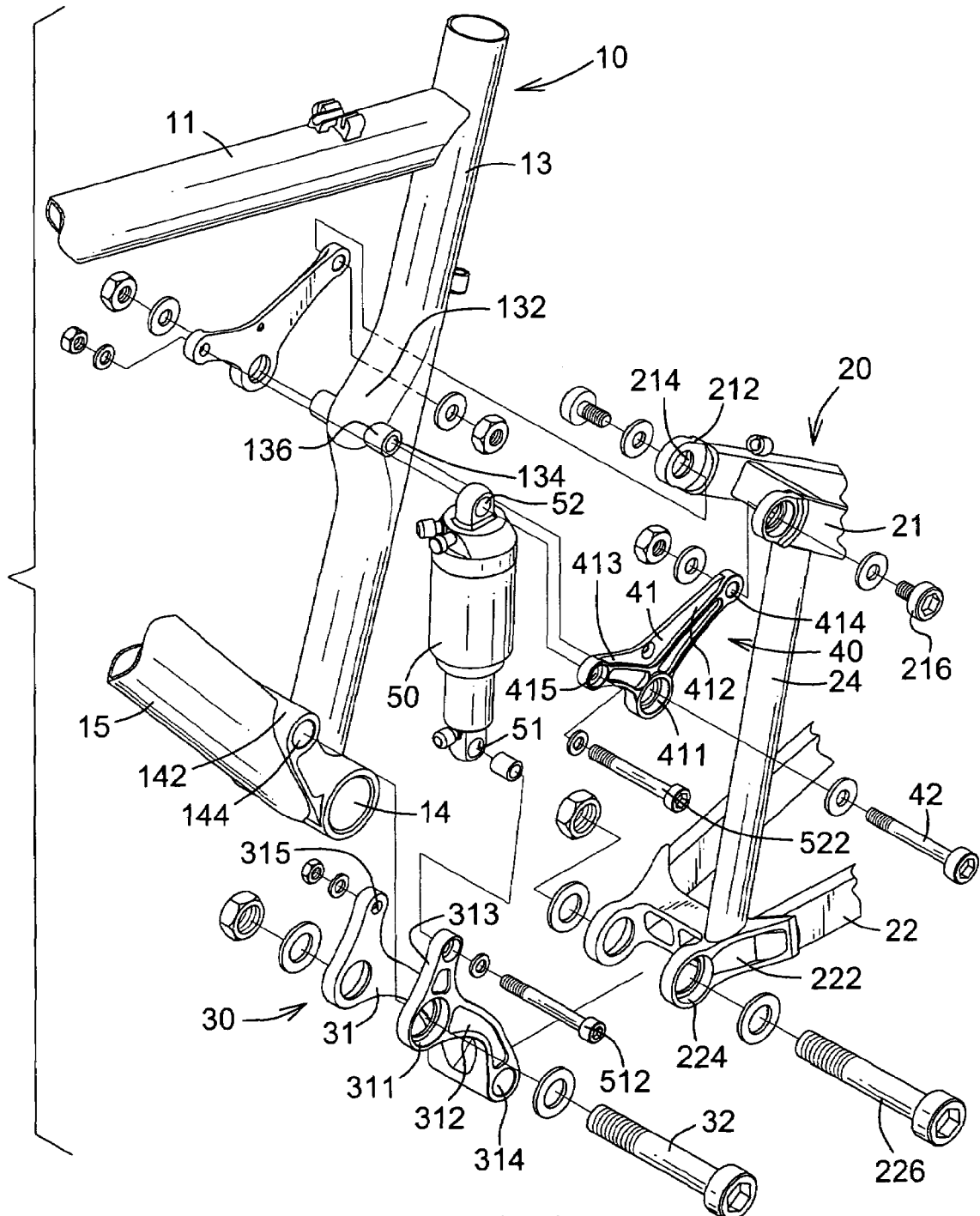
FIG. 2 is an enlarged exploded perspective view of a shock absorber and associated bracket assemblies on the bicycle frame in FIG. 1.

With reference to FIGS. 1 and 2, a bicycle frame in accordance with the present invention comprises a front frame (10), a lower bracket assembly (30), an upper bracket assembly (40), a rear frame (20) and a shock absorber (50).

The front frame (10) has a front, a rear a head tube (12), a down tube (15), an optional top tube (11), a bottom bracket shell (14) and a seat tube (13).

The head tube (12) is at the front of the front frame (10).

The down tube (15) is connected to and protrudes at an angle down from the head tube (12) toward the rear end of the front frame and has a bottom end.

The top tube (11) is substantially horizontal, is connected to and protrudes substantially horizontally from the head tube (12) toward the rear end of the front frame (10) and has a rear end.

The bottom bracket shell (14) is connected transversally to the bottom end of the down tube (15) and has a top, an optional lower bracket seat (142) and an optional pivot hole (144). The lower bracket seat (142) is formed on and protrudes up from the top of the bottom bracket shell (14) and has two sides. The pivot hole (144) is formed transversally through the lower bracket seat (142).

The seat tube (13) is connected to and protrudes up from the bottom bracket shell (14), is connected to the rear end of the top tube (11) and has an upper end, a lower end, an optional upper bracket seat (132), an optional pivot hole (134) and two optional mounting tubes (136). The upper bracket seat (132) is formed on and protrudes forward from the seat tube (13) between the upper end and the lower end and has two sides. The pivot hole (134) is formed transversally through the upper bracket seat (132) and has two ends. The mounting tubes (136) are connected respectively to and protrude respectively from the sides of the upper bracket seat (132), are aligned with each other and coaxially protrude respectively from ends of the pivot hole (134).

The lower bracket assembly (30) is connected pivotally to the front frame (10) and has a lower connecting bracket (31) and a fastener (32). The lower connecting bracket (31) is U-shaped, is connected pivotally to the bottom bracket shell (14) and has a rear end, a front end, two rear arms (312), two connecting arms (313), an optional connecting hole (314), two optional mounting holes (311) and two optional through holes (315).

The rear arms (312) are connected parallel to each other, curve downward, form the rear end of the lower connecting bracket (31) and abut the bottom bracket shell (14) and each rear arm (312) has a front end and a rear end.

The connecting arms (313) are formed respectively on and protrude up from the front ends of the rear arms (312) and press respectively against the sides of the lower bracket seat (142) of the bottom bracket shell (14).

The connecting hole (314) is formed through the front end of the rear arm (312).

The mounting holes (311) are formed respectively through the front ends of the rear arms (312) and correspond to the pivot hole (144) in the bottom bracket shell (14).

The through holes (315) are formed respectively through the connecting arms (313) near the corresponding mounting holes (311).

The fastener (32) attaches the lower connecting bracket (31) pivotally to the bottom bracket shell (14) and may be implemented as a bolt extending through and being mounted in the mounting holes (311) and the pivot hole (144) in the bottom bracket shell (14).

The upper bracket assembly (40) is attached pivotally to the front frame (10) and has two upper connecting brackets (41) and an optional fastener (42). The upper connecting brackets (41) are a flattened V-shape and are connected pivotally to the seat tube (13), and each upper connecting bracket (41) has a front end, a rear end, a rear arm (412), a front arm (413), an optional connecting hole (414), an optional mounting hole (411) and an optional through hole (415).

The rear arms (412) are formed respectively at the rear ends of the upper connecting brackets (41).

The front arms (413) are formed respectively at the front ends of the upper connecting brackets (41) and are shorter than the rear arms (412) of the upper connecting brackets (41).

The connecting holes (414) are formed respectively through the rear arms (412) of the upper connecting brackets (41).

The mounting holes (411) are formed respectively through the corresponding upper connecting brackets (41) between the rear arms (412) and the front arms (413) and are pivotally mounted respectively around the corresponding mounting tubes (136) of the seat tube (13).

The through holes (415) are formed respectively through the front arms (413) of the upper connecting brackets (41).

The fastener (42) extends through the mounting holes (411) in the upper connecting brackets (41) and the pivot hole (134) in the seat tube (13) to connect the upper connecting brackets (41) to the seat tube (13).

The rear frame (20) is connected pivotally to the lower bracket assembly (30) and the upper bracket assembly (40) and has an upper fork (21), a lower fork (22), two dropouts (23) and an optional vertical stay (24).

The upper fork (21) is connected to the upper bracket assembly (40) and has two upper tines and an upper cross member. The upper tines are parallel to each other and are connected respectively to the upper connecting brackets (41) of the upper bracket assembly (40), and each upper tine has a front end (212), a pivot hole (214), a fastener (216) and a rear end. The front ends (212) are pivotally connected respectively to the corresponding rear arms (412) of the upper connecting brackets (41). The pivot holes (214) are formed respectively through the front ends (212) and are aligned with each other. The fasteners (216) extend respectively through the corresponding pivot holes (214), connect respectively to the corresponding rear arms (412) of the upper connecting brackets (41) and may extend respectively through the connecting holes (414) in the corresponding upper connecting brackets (41). The upper cross member is connected between the front ends (212) of the upper tines.

Figure 4:
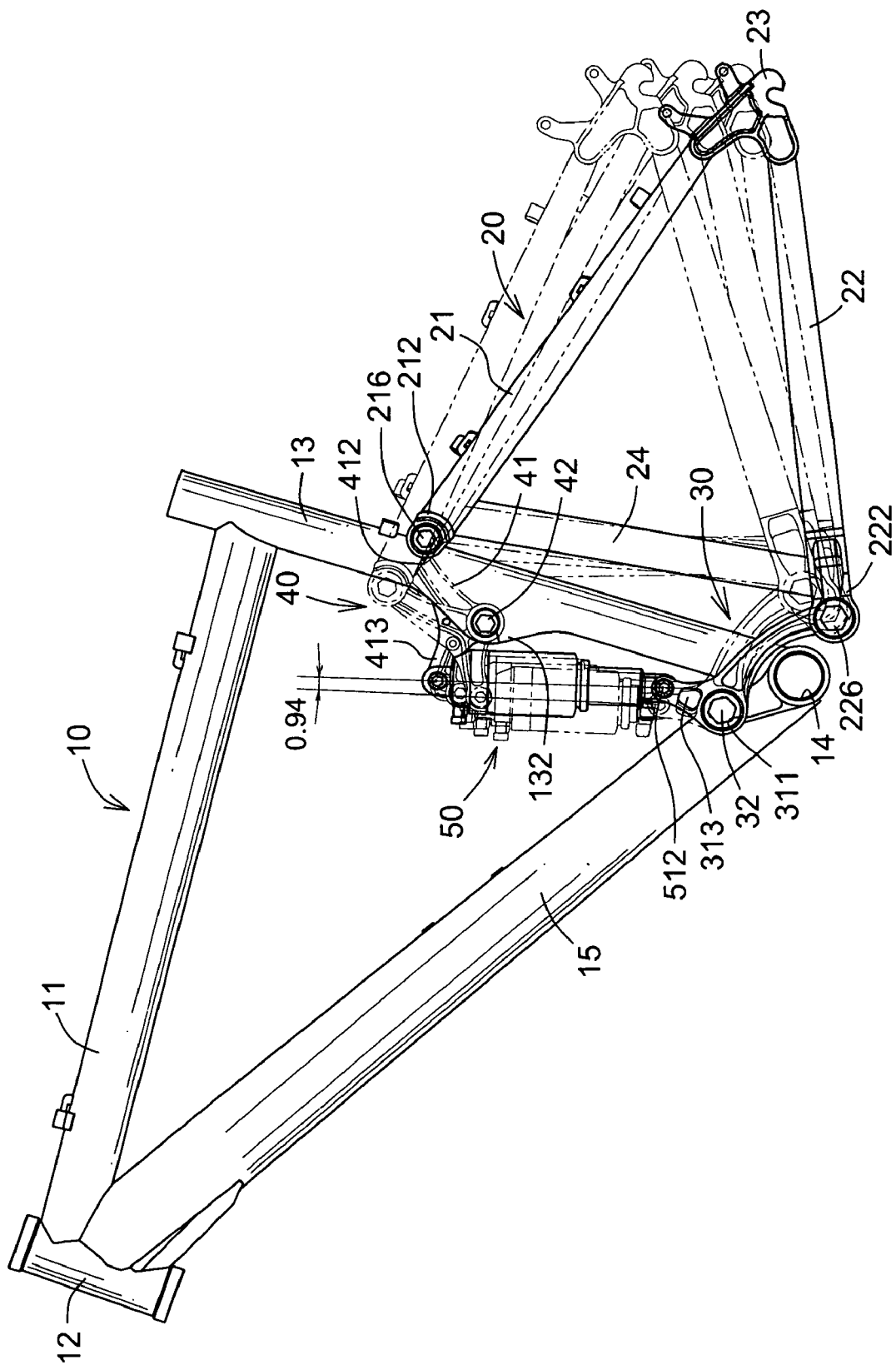
FIG. 4 is an operational side view of the bicycle frame in FIG. 1.
Figure 5:
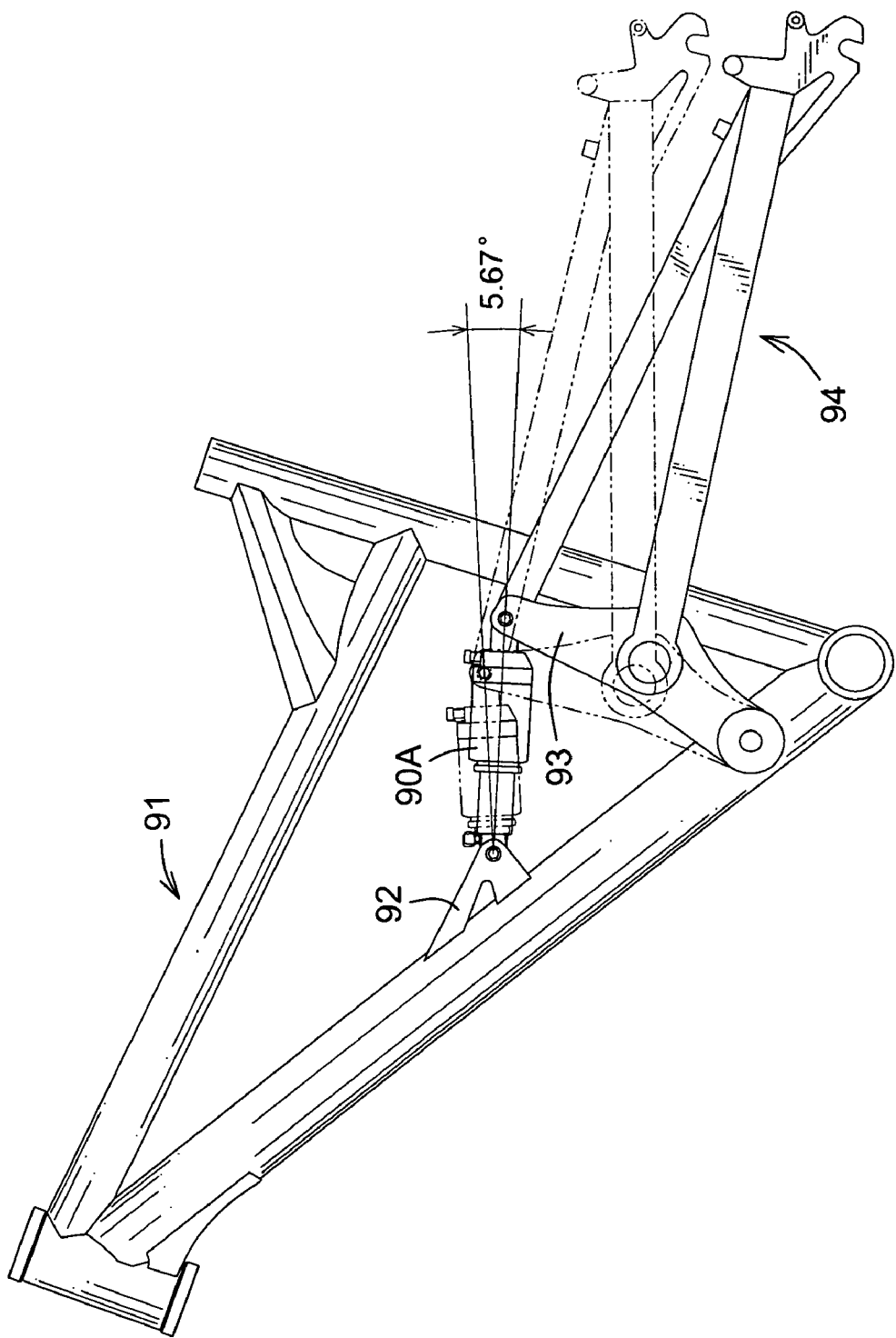
FIG. 5 is a side view of a conventional bicycle frame in accordance with the prior art.
Figure 6:
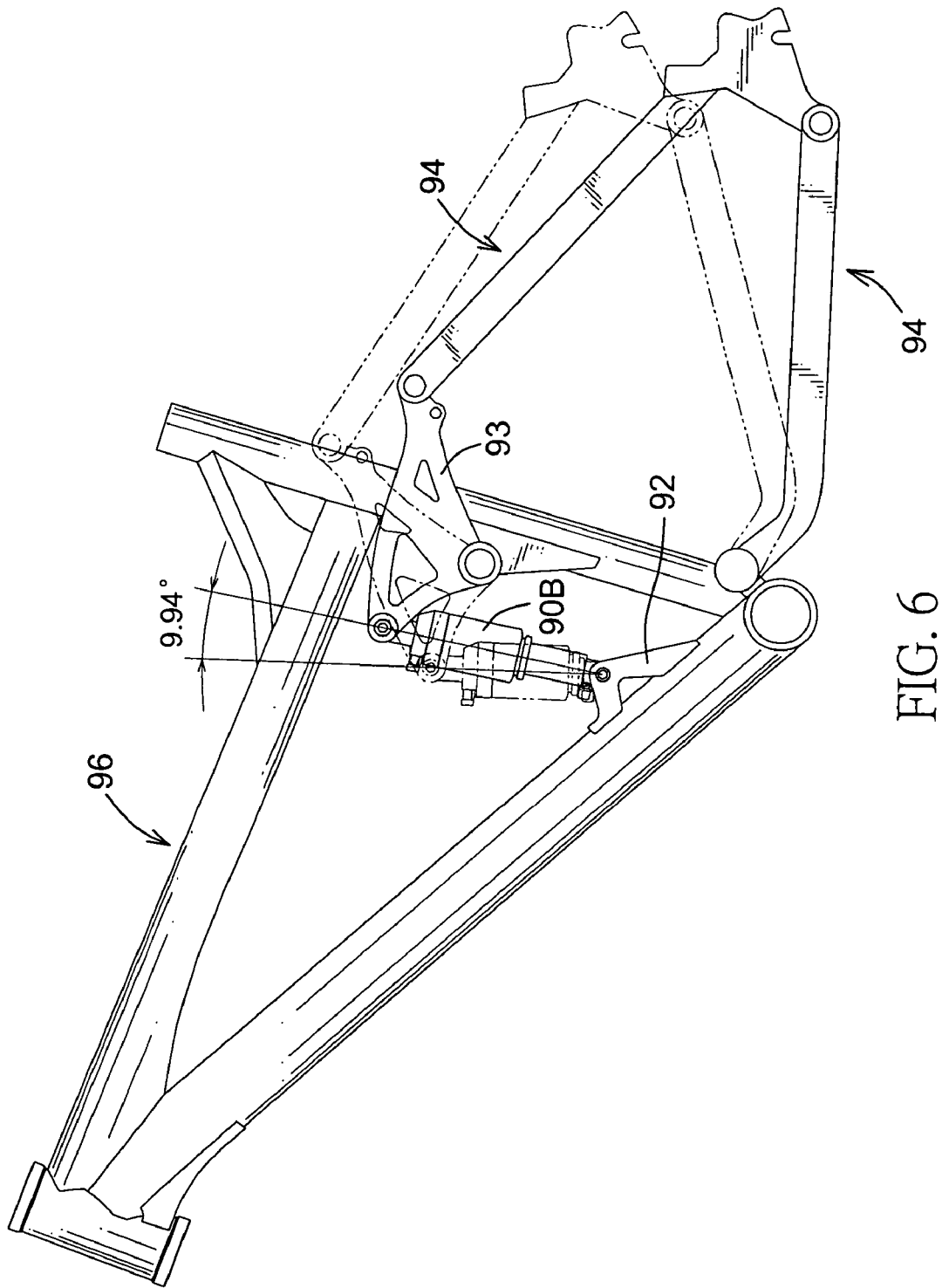
FIG. 6 is a side view of another conventional bicycle frame in accordance with the prior art.

With further reference to FIG. 4, application of a shock to the rear frame (20) moves the upper fork (21) up and pivots the rear arms (412) of the upper connecting brackets (41) of the upper bracket assembly (40) up, which pivots the front arms (413) down and only slightly forward.

The lower fork (22) is connected to the lower bracket assembly (30) and has two lower tines and a lower cross member. The lower tines are parallel to each other and are connected to the lower connecting bracket (31) of the lower bracket assembly (30), and each lower tine has a rear end, a front end (222), a pivot hole (224) and a fastener (226). The front ends (222) are pivotally connected respectively to the corresponding rear arms (312) of the lower connecting bracket (31). The pivot holes (224) are formed respectively through the corresponding front ends (222) and are aligned with each other. The fastener (226) pivotally attaches the front ends (222) respectively to the rear arms (312) of the lower connecting bracket (31) and may be implemented as a bolt that extends through the pivot holes (224) and the connecting hole (314) in the lower connecting bracket (31) to pivotally connect the lower fork (22) to the lower bracket assembly (30). The lower cross member is connected between the front ends (222) of the lower tines. Application of a shock to the rear frame (20) moves the lower fork (22) up and pivots the rear arms (312) of the lower connecting bracket (31) of the lower bracket assembly (30) up, which pivots the connecting arms (413) slightly forward.

A dropout (23) is attached to the rear ends of each corresponding upper and lower tine respectively on the upper fork (21) and the lower fork (22).

The vertical stay (24) is connected between the upper and lower cross members respectively of the upper fork (21) and the lower fork (22).

Figure 3:
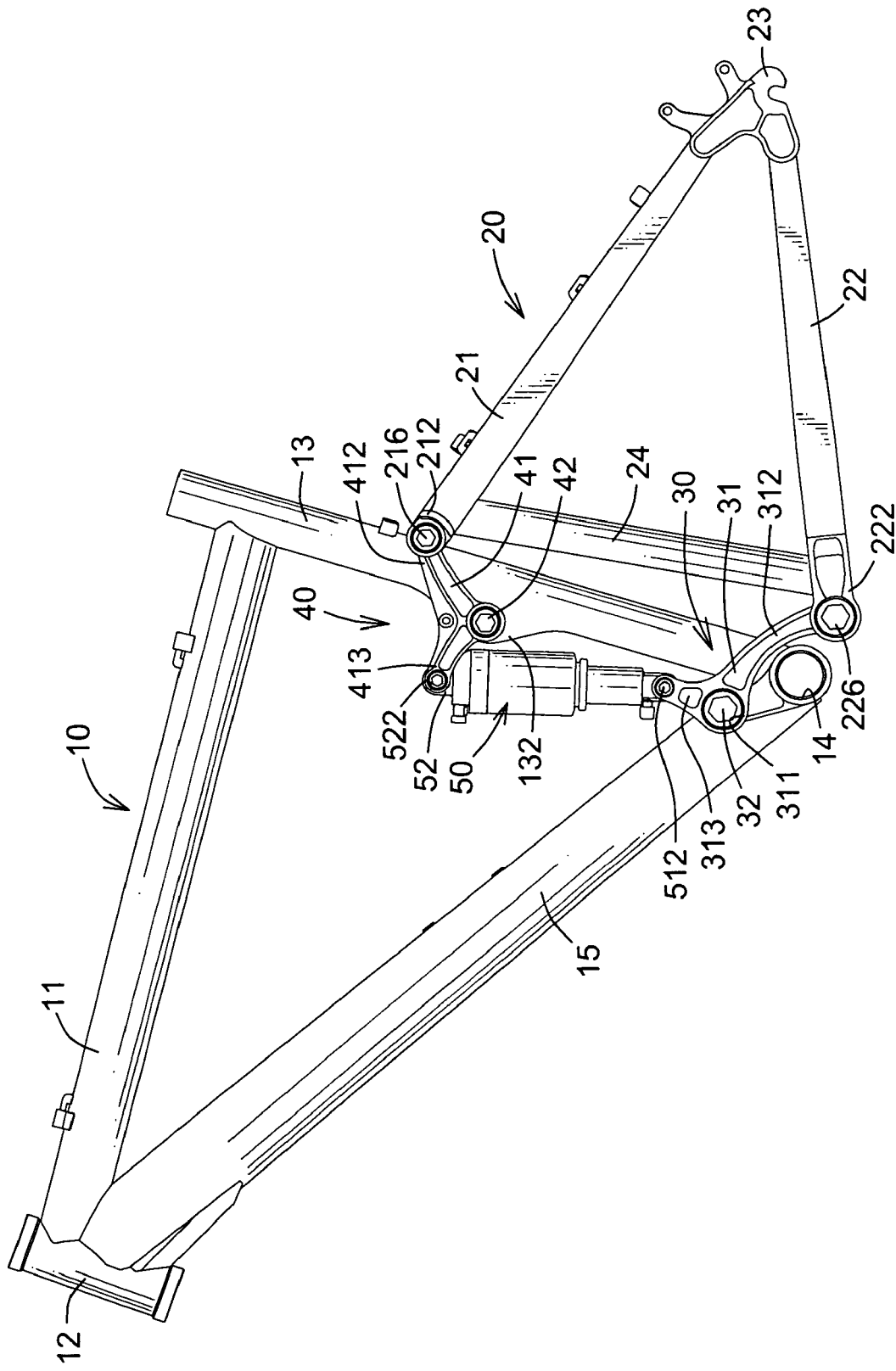
FIG. 3 is a side view of the bicycle frame in FIG. 1.

With further reference to FIG. 3, the shock absorber (50) is mounted pivotally and vertically between the lower bracket assembly (30) and the upper bracket assembly (40), absorbs shock applied to the rear frame (20), and has a top end, a bottom end, an upper pivot hole (52), an upper fastener (522), a lower pivot hole (51) and a lower fastener (512).

The upper pivot hole (52) is formed transversely through the top end of the shock absorber (50), is mounted pivotally between the front arms (413) on the upper connecting brackets (41) of the upper bracket assembly (40) and corresponds to the through holes (415) in the front arms (413) of the upper connecting brackets (41).

The upper fastener (522) extends pivotally through the upper pivot hole (52) in the shock absorber (50), is attached to the front arms (413) of the upper connecting brackets (41) to connect the shock absorber (50) pivotally to the upper connecting brackets (41) and may further extend through the through holes (415) in the upper connecting brackets (41).

The lower pivot hole (51) is formed transversely through the bottom end of the shock absorber (50), is mounted pivotally between the connecting arms (313) on the lower connecting bracket (31) of the lower bracket assembly (30) and corresponds to the through holes (315) in the lower connecting brackets (31).

The lower fastener (512) extends pivotally the lower pivot hole (51) in the shock absorber (50), is attached to the connecting arms (313) of the lower connecting bracket (31) to connect the shock absorber (50) pivotally to the lower connecting bracket (31) and may further extend through the through holes (315) in the lower connecting bracket (31).

With the shock absorber (50) mounted pivotally and vertically between the lower bracket assembly (30) and the upper bracket assembly (40), a shock applied to the rear frame (20) causes the rear frame (20) to move up, pivot the upper connecting brackets (41) and the lower connecting bracket (31) and compress the shock absorber (50) to absorb the shock. However, the lower connecting bracket (31) of the lower bracket assembly (30) and the upper connecting brackets (41) of the upper bracket assembly (40) pivot synchronously so the shock absorber (50) is subjected to a change in vertical angle of less than 2°.

The bicycle frame as described has the following advantages.

1. The bicycle frame decreases the change in vertical angle of the shock absorber (50) less 2°.

2. Keeping the change in vertical angle of the shock absorber (50) small reduces frictional wear on the shock absorber (50) and prevents damage to the shock absorber (50). Consequently, the life of the shock absorber (50) will be longer than a conventional shock absorber (90A, 90B) mounted conventionally.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A frame for a bicycle having
   a front frame having
      a front;
      a rear;
      a head tube being at the front of the front frame;
      a down tube being connected to and protruding at an angle down from the head tube toward the rear end of the front frame and having a bottom end;
      a bottom bracket shell being connected transversely to the bottom end of the down tube and having a top;
      a seat tube being connected to and protruding up from the bottom bracket shell, being connected to the rear end of the top tube and having
         an upper end; and
         a lower end;
   a lower bracket assembly being connected pivotally to the front frame and having
      a lower connecting bracket being U-shaped, being connected pivotally to the bottom bracket shell and having
         a rear end;
         a front end;
         two rear arms being connected parallel to each other, curving downward, forming the rear end of the lower connecting bracket and abutting the bottom bracket shell, and each rear arm having
            a front end; and
            a rear end; and
         two connecting arms being formed respectively on and protruding up from the front ends of the rear arms; and
      a fastener attaching the lower connecting bracket pivotally to the bottom bracket shell;
   an upper bracket assembly being attached pivotally to the front frame and having two upper connecting brackets being a flattened V-shape and being connected pivotally to the seat tube, and each upper connecting bracket having
      a front end;
      a rear end;
      a rear arm being formed at the rear end; and
      a front arm being formed at the front end and being shorter than the rear arms;
   a rear frame being connected pivotally to the lower bracket assembly and the upper bracket assembly and having
      an upper fork being connected to the upper bracket assembly and having
         two upper tines being parallel to each other and being connected respectively to the upper connecting brackets of the upper bracket assembly, and each upper tine having
            a front end being pivotally connected to the rear arm of a corresponding one of the upper connecting brackets;
            a pivot hole being formed through the front end and being aligned with each other;
            a fastener extending through the corresponding pivot hole and connecting to the rear arm of the corresponding upper connecting bracket; and
            a rear end; and
         an upper cross member being connected between the front ends of the upper tines;
      a lower fork being connected to the lower bracket assembly and having
         two lower tines being parallel to each other and being connected to the lower connecting bracket of the lower bracket assembly, and each lower tine having
            a rear end;
            a front end being pivotally connected to the rear arm of a corresponding lower connecting bracket;
            a pivot hole being formed through the front end and being aligned with each other; and
            a fastener pivotally attaching the front ends respectively to the rear arms of the lower connecting bracket; and
         a lower cross member being connected between the front ends of the lower tines; and
      two dropouts with a dropout being attached to the rear ends of the rear ends of each corresponding upper and lower tine respectively on the upper fork and the lower fork; and
   a shock absorber being mounted pivotally and vertically between the lower bracket assembly and the upper bracket assembly, absorbing shock applied to the rear frame and having
      a top end;
      a bottom end;
      an upper pivot hole being formed transversely through the top end of the shock absorber and being mounted pivotally between the front arms on the upper connecting brackets of the upper bracket assembly;
      an upper fastener extending pivotally through the upper pivot hole in the shock absorber and being attached to the front arms of the upper connecting brackets to connect the shock absorber pivotally to the upper connecting brackets;
      a lower pivot hole being formed transversely through the bottom end of the shock absorber and being mounted pivotally between the connecting arms on the lower connecting bracket of the lower bracket assembly; and
      a lower fastener extending pivotally through the lower pivot hole in the shock absorber and being attached to the connecting arms of the lower connecting bracket to connect the shock absorber pivotally to the lower connecting bracket.

2. The bicycle frame as claimed in claim 1, wherein
the front frame further has a top tube being connected to and protruding from the head tube toward the rear end of the front frame and having a rear end; and
the seat tube is connected to the rear end of the top tube and further has an upper bracket seat formed on and protruding forward from the seat tube between the upper end and the lower end and protruded up to the head tube and having two sides.

3. The bicycle frame as claimed in claim 1, wherein the rear frame further has a vertical stay connected between the upper and lower cross members respectively of the upper fork and the lower fork.

4. The bicycle frame as claimed in claim 1, wherein
the bottom bracket shell further has a lower bracket seat being formed on and protruding up from the top of the bottom bracket shell and having two sides;
the connecting arms of the lower bracket assembly press respectively against the sides of the lower bracket seat of the bottom bracket shell;
the lower connecting bracket further has a connecting hole formed through the front end of the rear arm; and
the fastener of each lower tine in the lower fork comprises a bolt that extends through the pivot holes and the connecting hole in a corresponding lower connecting bracket to pivotally connect the lower fork to the lower bracket assembly.

5. The bicycle frame as claimed in claim 2, wherein
the seat tube further has
 a pivot hole formed transversally through the upper bracket seat and having two ends; and
 two mounting tubes connected respectively to and protruding respectively from the sides of the upper bracket seat, being aligned with each other and coaxially protruding respectively from ends of the pivot hole;
each upper connecting bracket further has a mounting hole formed through the upper connecting bracket between the rear arm and the front arm, and the upper connecting brackets are pivotally mounted respectively around the mounting tubes of the seat tube; and
the upper bracket assembly further has a fastener extending through the mounting holes in the upper connecting brackets and the pivot hole in the seat tube to connect the upper connecting brackets to the seat tube.

6. The bicycle frame as claimed in claim 5, wherein
each upper connecting brackets further has a connecting hole formed through the rear arm of the upper connecting bracket; and
the fastener of each upper tine in the upper fork extends through the connecting hole in a corresponding upper connecting bracket.

7. The bicycle frame as claimed in claim 6, wherein
the bottom bracket shell further has a pivot hole formed transversally through the lower bracket seat;
the lower connecting bracket further has two mounting holes formed respectively through the front ends of the rear arms and correspond to the pivot hole in the bottom bracket shell; and
the fastener of the lower bracket assembly comprises a bolt extending through and being mounted in the mounting holes and the pivot hole in the bottom bracket shell.

8. The bicycle frame as claimed in claim 7, wherein
the lower connecting bracket further has two through holes formed respectively through the connecting arms near the mounting holes;
the lower pivot hole of the shock absorber corresponds to the through holes in the lower connecting brackets; and
the lower fastener of the shock absorber further extends through the through holes in the lower connecting bracket.

9. The bicycle frame as claimed in claim 8, wherein
each upper connecting bracket further has a through hole formed through the front arm of the upper connecting bracket;
the upper pivot hole of the shock absorber corresponds to the through holes in the front arms of the upper connecting brackets; and
the upper fastener of the shock absorber further extends through the through holes in the upper connecting brackets.

* * * * *